United States Patent [19]
Brown et al.

[11] Patent Number: 5,599,472
[45] Date of Patent: Feb. 4, 1997

[54] RESEALABLE RETORT FOR INDUCTION PROCESSING OF ORGANIC MATRIX COMPOSITES OR METALS

[75] Inventors: Ronald W. Brown; Marc R. Matsen, both of Seattle, Wash.

[73] Assignee: The Boeing Company, Seattle, Wash.

[21] Appl. No.: 341,779

[22] Filed: Nov. 18, 1994

Related U.S. Application Data

[63] Continuation-in-part of Ser. No. 169,655, Dec. 16, 1993, Pat. No. 5,530,227, Ser. No. 92,050, Jul. 15, 1993, Pat. No. 5,410,133, and Ser. No. 151,433, Nov. 12, 1993, Pat. No. 5,420,400, said Ser. No. 169,655, is a continuation-in-part of Ser. No. 777,739, Oct. 15, 1991, Pat. No. 5,410,132, said Ser. No. 92,050, is a division of Ser. No. 681,004, Apr. 5, 1991, Pat. No. 5,229,562.

[51] Int. Cl.$^6$ ...................................................... H05B 6/10
[52] U.S. Cl. ........................... 219/634; 219/615; 219/645
[58] Field of Search .................................. 219/604, 615, 219/645, 633, 634, 635, 621; 72/60, 70

[56] References Cited

U.S. PATENT DOCUMENTS

| | | |
|---|---|---|
| 2,984,732 | 5/1961 | Herbert . |
| 3,110,961 | 11/1963 | Melill et al. . |
| 3,444,275 | 5/1969 | Willett . |
| 3,529,458 | 9/1970 | Butler et al. . |
| 3,595,060 | 7/1971 | Hundy . |
| 3,605,477 | 9/1971 | Carlson . |
| 3,661,491 | 5/1972 | Troyer . |
| 3,705,284 | 12/1972 | Binard . |
| 3,890,819 | 6/1975 | DeLuca . |
| 3,920,175 | 11/1975 | Hamilton et al. . |
| 3,927,817 | 12/1975 | Hamilton et al. . |
| 3,934,441 | 1/1976 | Hamilton et al. . |
| 3,974,673 | 8/1976 | Fosness et al. . |
| 4,060,364 | 11/1977 | Gras . |
| 4,111,024 | 9/1978 | Dahlman et al. . |
| 4,117,970 | 10/1978 | Hamilton et al. . |
| 4,141,484 | 2/1979 | Hamilton et al. . |
| 4,145,903 | 3/1979 | Leach et al. . |
| 4,150,927 | 4/1979 | Steingroever . |
| 4,188,811 | 2/1980 | Brimm . |
| 4,217,397 | 8/1980 | Hayase et al. . |
| 4,233,829 | 11/1980 | Hamilton et al. . |
| 4,233,831 | 11/1980 | Hamilton et al. . |
| 4,269,053 | 5/1981 | Agrawal et al. . |
| 4,292,375 | 9/1981 | Ko . |
| 4,304,821 | 12/1981 | Hayase et al. . |
| 4,306,436 | 12/1981 | Schulz et al. . |
| 4,331,284 | 5/1982 | Schulz et al. . |
| 4,352,280 | 10/1982 | Ghosh . |
| 4,393,987 | 7/1983 | Anderson et al. . |
| 4,474,044 | 10/1984 | Leistner et al. . |
| 4,524,037 | 6/1985 | Marc . |
| 4,530,197 | 7/1985 | Rainville . |
| 4,544,339 | 10/1985 | Itoh . |
| 4,555,373 | 11/1985 | Bloemkolk et al. . |
| 4,563,145 | 1/1986 | de Meij . |
| 4,584,860 | 4/1986 | Leonard . |
| 4,603,089 | 7/1986 | Bampton . |
| 4,603,808 | 8/1986 | Stacher . |
| 4,622,445 | 11/1986 | Matsen . |
| 4,635,461 | 1/1987 | Raymond . |
| 4,649,249 | 3/1987 | Odor . |
| 4,657,717 | 4/1987 | Cattanach et al. . |

(List continued on next page.)

*Primary Examiner*—Tu Hoang
*Attorney, Agent, or Firm*—John C. Hammar

[57] ABSTRACT

For forming or consolidating organic matrix composites, an organic matrix composite panel is placed between sheets of a susceptor material that is susceptible to induction heating. The susceptor sheets enclose the panel and define a retort. Peripheral gaskets temporarily seal the retort when the retort is placed within upper and lower dies of an induction heating workcell where the susceptor sheets are heated inductively. The sheets in turn conduct heat to the organic matrix composite panel. When heated to the desired temperature, the composite panel is consolidated and/or formed. In some circumstances, edge seal strips are used to provide electrical continuity between the upper and lower sheets in the retort. An analogous retort can be used for metal processing operations.

16 Claims, 5 Drawing Sheets

U.S. PATENT DOCUMENTS

| | | | |
|---|---|---|---|
| 4,706,361 | 11/1987 | Meyer et al. | |
| 4,708,008 | 11/1987 | Yasui et al. | 72/60 |
| 4,713,953 | 12/1987 | Yavari | |
| 4,716,072 | 12/1987 | Kim | |
| 4,808,362 | 2/1989 | Freeman | |
| 4,824,617 | 4/1989 | Takeuchi et al. | |
| 4,855,011 | 8/1989 | Legge et al. | |
| 4,882,823 | 11/1989 | Weisert et al. | |
| 4,888,973 | 12/1989 | Comley | |
| 4,889,276 | 12/1989 | Cadwell et al. | |
| 4,901,552 | 2/1990 | Ginty et al. | |
| 4,906,172 | 3/1990 | Stewart | |
| 4,941,814 | 7/1990 | Araki et al. | |
| 4,951,491 | 8/1990 | Lorenz | |
| 4,984,348 | 1/1991 | Cadwell | |
| 4,988,037 | 1/1991 | Cadwell | |
| 5,018,328 | 5/1991 | Cur et al. | |
| 5,024,369 | 6/1991 | Froes et al. | |
| 5,032,327 | 7/1991 | Becheret | |
| 5,047,199 | 9/1991 | Leca et al. | |
| 5,047,605 | 9/1991 | Ogden | |
| 5,064,978 | 11/1991 | Scholz | |
| 5,087,193 | 2/1992 | Herbert, Jr. | |
| 5,093,545 | 3/1992 | McGaffigan | |
| 5,115,963 | 5/1992 | Yasui | |
| 5,118,026 | 6/1992 | Stacher | |
| 5,129,249 | 7/1992 | Fournier | 72/70 |
| 5,139,407 | 8/1992 | Kim et al. | |
| 5,141,146 | 8/1992 | Yasui | |
| 5,142,842 | 9/1992 | Schirmer | |
| 5,156,795 | 10/1992 | Harvey et al. | |
| 5,229,562 | 7/1993 | Burnett et al. | |
| 5,309,747 | 5/1994 | Yasui | 72/60 |
| 5,338,497 | 8/1994 | Murray et al. | |
| 5,366,684 | 11/1994 | Corneau, Jr. | |
| 5,368,807 | 11/1994 | Lindsay | |
| 5,410,132 | 4/1995 | Gregg et al. | 219/604 |
| 5,410,133 | 4/1995 | Matsen et al. | 219/645 |
| 5,419,170 | 5/1995 | Sanders et al. | 72/60 |
| 5,420,400 | 5/1995 | Matsen | 219/615 |

FOREIGN PATENT DOCUMENTS

| | | |
|---|---|---|
| 0155820 | 9/1985 | European Pat. Off. |
| 0195562 | 10/1992 | European Pat. Off. |
| 1418327 | 12/1975 | United Kingdom |

RESEALABLE RETORT FOR INDUCTION PROCESSING OF ORGANIC MATRIX COMPOSITES OR METALS

REFERENCE TO RELATED APPLICATIONS

The present application is a continuation-in-part application based upon U.S. patent application Ser. No. 08/169,655, filed Dec. 16, 1993, now U.S. Pat. No. 5,530,227 (which was a continuation-in-part application of U.S. patent application Ser. No. 07/777,739, filed Oct. 15, 1991, now U.S. Pat. No. 5,410,132). The present application also is a continuation-in-part application based upon U.S. patent application Ser. No. 08/092,050, filed Jul. 15, 1993, now U.S. Pat. No. 5,410,133 (a divisional of U.S. patent application Ser. No. 07/681,004, filed Apr. 5, 1991, now U.S. Pat. No. 5,229,562). Finally, the present application is also a continuation-in-part application based upon U.S. patent application Ser. No. 08/151,433, filed Nov. 12, 1993, now U.S. Pat. No. 5,420,400. We incorporate these applications and patent by reference.

FIELD OF THE INVENTION

The present invention relates to a resealable bag of susceptor sheets for the induction consolidation or forming of organic matrix composites or induction processing of metals (especially brazing super-plastic forming (SPF), or combined brazing/SPF cycles). The bag includes a sealing mechanism for the susceptor sheets which permits their reuse.

BACKGROUND OF THE INVENTION

Fiber-reinforced organic resin matrix composites have a high strength-to-weight ratio or high stiffness-to-weight ratio and desirable fatigue characteristics that make them increasingly popular as a replacement for metal in aerospace applications where weight, strength, or fatigue is critical. Composites today, however, are expensive. There is a need for improved manufacturing processes to reduce touch labor and the forming time.

Prepregs combine continuous, woven, or chopped fibers with an uncured matrix resin, and usually are fiber sheets with a thin film of the matrix. Sheets of prepreg generally are placed (laid-up) directly upon a tool or die having a forming surface contoured to the desired shape of the completed part or are laid-up in a flat sheet which is then draped and formed over the tool or die to the contour of the tool. Lay up can be by hand or with specialized tow or tape placement equipment. Then the resin in the prepreg lay up is consolidated (i.e., cured) in a vacuum bag process in an autoclave (i.e., a pressure oven) to complete the part.

The tools or dies for metal or composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed after producing only a few parts of each kind.

In hot press forming, the prepreg is laid-up, bagged (if necessary), and placed between matched metal tools that include forming surfaces that define the internal, external, or both mold lines of the completed part. The tools and composite preform are placed within a press and then the tools, press, and preform are heated. By "preform" we mean the prepreg lay up.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

One method used to reduce the costs of fabricating composite materials is to lay up a flat panel and then to place the flat panel between two metal sheets made from a superplastic alloy. This process is described in U.S. Pat. No. 4,657,717. The flat composite panel and metal sheets are then superplastically formed (SPF) against a die having a surface precisely contoured to the final shape of the part.

Attempts have been made to reduce composite fabrication times by actively cooling the tools after forming the composite part. These attempts have shortened the time necessary to produce a composite part, but the time for and cost of heating and cooling remain significant contributors to overall fabrication costs. Designing and making tools with active cooling increases their cost.

Boeing described a process for organic matrix forming and consolidation using induction heating in U.S. Pat No. 5,530,227. There, prepregs were laid up in a flat sheet and were sandwiched between aluminum susceptor facesheets. To ensure an inert atmosphere around the composite during curing and to permit withdrawing volatiles and outgassing from around the composite during the consolidation, we welded the facesheets around their periphery. Such welding unduly impacts the preparation time and the cost for part fabrication. It also ruined the facesheets (i.e., prohibited their reuse). The present invention is a technique that readily and reliably seals the facesheets without the need for welding and permits reuse of the facesheets in certain circumstances. Our "bag-and-seal" technique applies to both resin composite and metal processing, especially in our induction heating workcell.

An example of a metal forming process combines brazing and superplastic forming of metal with a single induction heating cycle. In such a process, Boeing uses a metal pack or retort to contain the multiple sheets in the workpiece in an appropriate inert pressure zone. See U.S. Pat. No. 5,420,400. Here, too, we weld the sheets of the retort along their periphery. The welds are costly to prepare, introduce trimming as a necessary step to recover the completed part, and limit the reuse of the retort sheets since they must be shaved smaller when trimming away the weld to recover the completed part.

For purposes of this description, we use "consolidation" to mean pressure compacting and curing of an organic matrix resin through thermally activated chemical reactions to produce a stable composite. By "forming," we mean shaping the composite or metal and retort in its plastic state. "Forming" may entail superplastic forming, drawing, or some other shaping operation, as those skilled in the art will understand.

SUMMARY OF THE INVENTION

The present invention is a resealable, reusable bag or retort for induction processing of plastics or metals. In the present invention, the dies or tooling for the induction processing are ceramic because a ceramic is not susceptible to induction heating and preferably, is a thermal insulator. Ceramic tooling is strengthened and reinforced with fiberglass rods or other appropriate reinforcements to permit it to withstand the temperatures and pressures necessary to form, to consolidate, or otherwise to process the composite materials or metals. Ceramic tools cost less to fabricate than metal tools and also generally have less thermal mass than metal tooling. Because the ceramic tooling is not susceptible to induction heating, it is possible to use the ceramic tooling in combination with induction heating elements to heat the composite or metal retort without significantly heating the tools. Thus, the method of the present invention can reduce the time required and energy consumed to fabricate a part.

While graphite or boron fibers can be heated directly by induction, most organic matrix composites require a susceptor in or adjacent to the composite material preform or metal workpiece to achieve the necessary heating for consolidation or forming. The susceptor is heated inductively and transfers its heat principally through conduction to the preform or workpiece that is sealed within the susceptor envelope or retort. Metals in the workpiece may themselves be susceptible to induction heating, but the metal workpiece needs to be shielded in an inert atmosphere during the high temperature processing to avoid corrosion of the metal, so we enclose the workpiece (one or more metal sheets) in a metal retort when using our ceramic tooling induction heating press. Enclosed in the metal retort, the workpiece does not experience the oscillating magnetic field which instead is stopped in the retort sheets, so heating in this case again is by conduction from the retort to the workpiece.

Induction focuses heating on the retort and workpiece and eliminates wasteful, inefficient heat sinks. Because the ceramic tools in our induction heating workcell do not heat to as high a temperature as the metal tooling of conventional, prior art presses, problems caused by different coefficients of thermal expansion between the tools and the workpiece are reduced.

In a method of the present invention for consolidating and/or forming organic matrix composite materials, an organic matrix composite preform is placed adjacent a metal susceptor. The susceptor is inductively heated to heat the preform. A consolidation and forming pressure is applied to consolidate and, if applicable, to form the preform at its curing temperature. Generally, the preform is enclosed between two susceptor sheets that are sealed to form a pressure zone. The two sealed susceptor sheets, typically aluminum or an aluminum SPF alloy, form a retort. We evacuate the pressure zone in the retort in a manner analogous to conventional vacuum bag processes for resin consolidation. The retort is placed in an induction heating press on the forming surfaces of dies having the desired shape of the molded composite part. After the retort (and preform) are inductively heated to the desired elevated temperature, we apply pressure (while maintaining the vacuum in the pressure zone around the preform) to consolidate the preform against the die into the desired shape of the completed composite panel.

The retort often includes three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) to help form the composite panel or workpiece. The shared wall of the three layer sandwich acts as a diaphragm in this situation.

In preparing the retort, we often use temporary seals to hold the sheets until the sheets are clamped into the press, and we prefer a "C" spring clamp. The clamp sandwiches the outer susceptor sheets of the retort and provides a compressive force to hold the retort together temporarily, pressing the sheets against an "O" ring gasket. Such a gasket seats between susceptor sheets in a machined groove or crimp around the periphery of adjacent susceptors. For processing below about 600° F., 315° C. the gasket is generally silicone rubber. Between about 600° F. and 1300° F., 705° C. the gasket is copper; above 1300° F., 705° C. the gasket is stainless steel. The gasket and susceptor sheets abut and form a gas seal via the compressive force of the die set. The "C" clamp permits handling of the retort in and out of the die set. The "C" clamp also provides a current path from the top sheet to the bottom sheet (when the gasket is rubber or stainless steel). The "C" clamp can be omitted when we use a copper gasket, but handling the susceptor sheets is more difficult. The "C" clamp jumper is only required for electrical continuity when the gasket is not an electrical conductor and, then, only on the edges of the retort transverse to the induction coils since the coils induce eddy currents in the susceptor that flow parallel to the coils.

DETAILED DESCRIPTION OF THE PREFERRED EMBODIMENT

Figure 1:
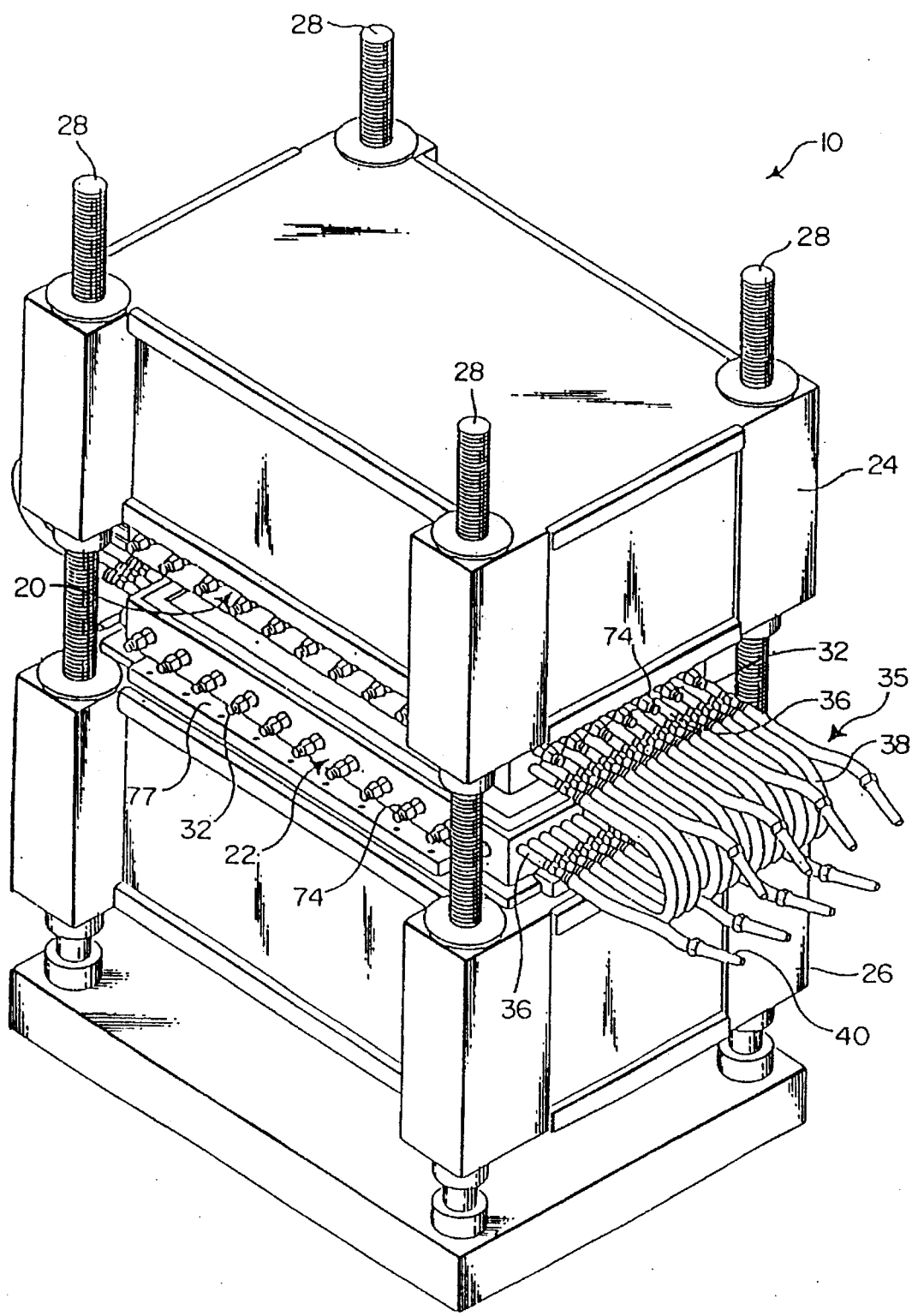
FIG. 1 is a perspective view of our induction heating workcell for consolidating and forming organic matrix composite panels or metal workpieces.

In FIG. 1, an induction heating workcell 10 includes tools or dies 20 and 22 mounted within an upper 24 and a lower 26 strongback. The strongbacks are each threaded onto four threaded column supports or jackscrews 28. We can turn the jackscrews using a bellows or other actuation mechanism to move one strongback up or down relative to the other. The strongbacks 24 and 26 provide a rigid, flat backing surface for the upper and lower dies 20 and 22 to prevent the dies from bending and cracking during repeated consolidation or forming operations. Preferably, the strongbacks should be capable of holding the dies to a surface tolerance of ±0.003 inches per square foot of the forming surface in the toolbox. Such tolerances are desirable to achieve proper part tolerances. The strongbacks may be steel, aluminum, or any other material capable of handling the loads present during forming or consolidation, but we prefer materials that are nonmagnetic to avoid any distortion to the magnetic field that our induction coils produce. In some circumstances, the dies may be strong enough themselves that strongbacks are unnecessary.

The dies 20 and 22 are usually ceramic that is reinforced with a plurality of fiberglass rods 32 that are held with bolts 74 and that extend both longitudinally and transversely in a grid through each die. Each die usually is framed with phenolic reinforcement 72 as well. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to inductive heating so that heating is localized in the retort rather than distributed in the press as well. We prefer a ceramic that has a low coefficient of thermal expansion, good thermal shock resistance, and relatively high compression strength, such as a castable fused silica ceramic.

A plurality of induction coils 35 are embedded in the dies. In the preferred embodiment, we use four separate induction coils 35, but the number can vary. Each induction coil 35 is formed front a straight tubing section 36 that extends along the length of each die and a flexible coil connector 38 that joins the straight tubing sections 36 in the upper die 20 to the straight tubing sections in the lower die 22. Connectors 40 located at the ends of the induction coils connect the induction coils 35 to an external power source or coil driver 50 and to a coolant source.

Cavities 42 and 44 in the respective dies hold tool inserts 46 and 48. The upper tool insert 46 in some applications has a contoured forming surface 58 that has a shape corresponding to the desired shape of the outer mold line surface of the completed composite. The lower tool insert determines the inner mold line. The tool inserts also should not be susceptible to inductive heating, preferably being formed of a castable ceramic. In some cases, both the dies and the tool inserts can be made from a matrix resin rather than from a ceramic. Using a resin, however, limits use of the tooling to low temperature operations, such as forming or consolidating certain organic matrix composites. We prefer ceramic tooling which provides the greatest flexibility and versatility for the induction heating workcell.

Figure 2:
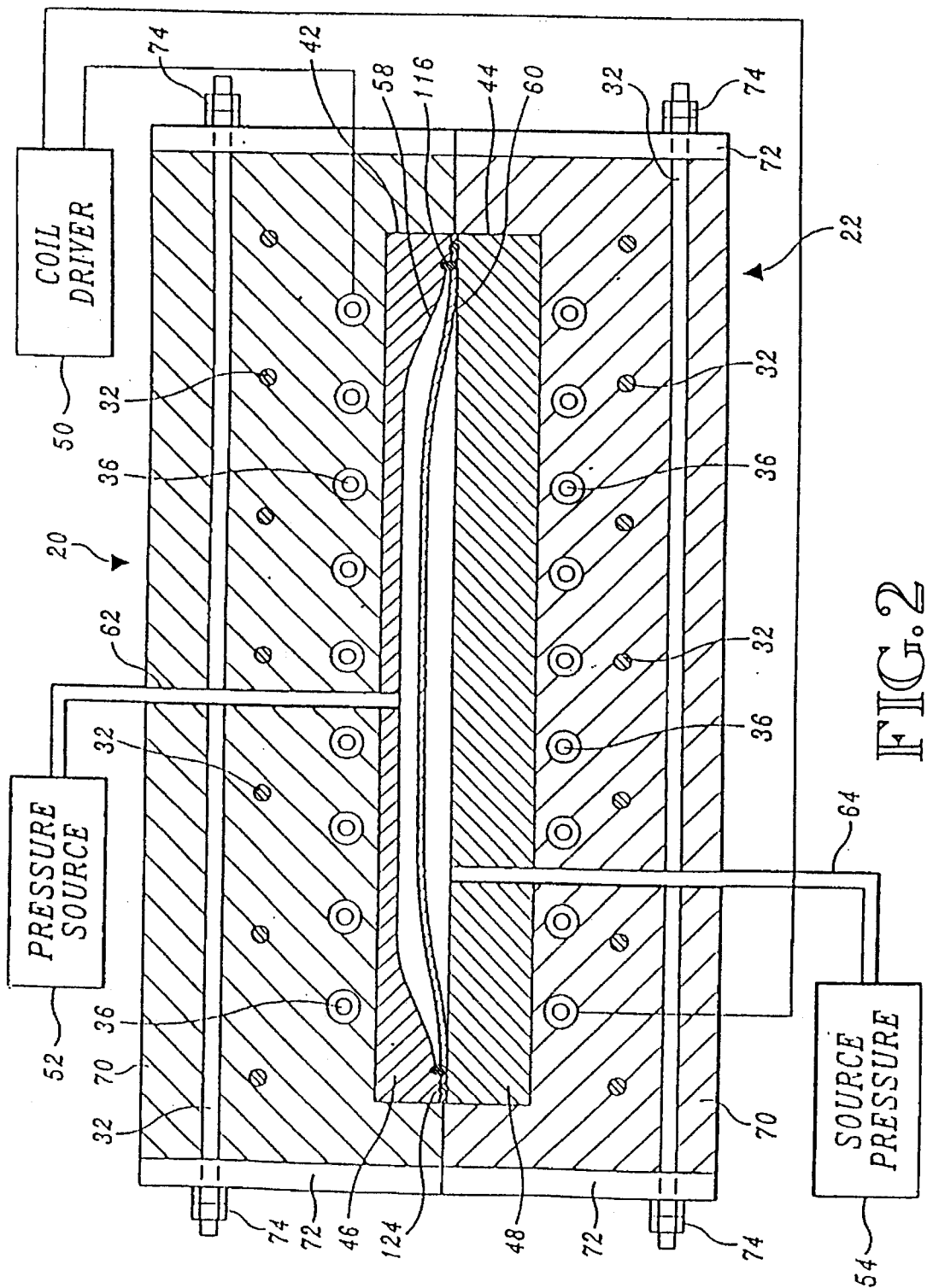
FIG. 2 is a schematic cross-sectional view of the apparatus of FIG. 1.

While the forming surfaces can be an integral part of the dies (FIG. 3–5), we prefer the separate die and tool insert configuration shown in FIG. 2 because changing tool inserts to make different parts is easier and quicker and the overall tooling costs are reduced.

Each die surrounds and supports the respective tool insert and holds the straight sections 36 of the induction coils in proper position in relationship to the tool insert. In the preferred embodiment, the interior 70 of the dies is formed of a castable phenolic or ceramic and the exterior sides from precast composite phenolic resin blocks 72. In some applications, we prefer to reinforce the phenolic or ceramic with chopped fibers or nonwoven or woven reinforcing mats.

To increase the strength of the dies, fiberglass reinforcing rods 32 extend both longitudinally and transversely through the precast exterior side blocks 72 and the interior 70 to maintain a compressive load on the blocks 72, interior 70 and the tool inserts 46 and 48.

FIG. 2 shows a retort 60 between the tool inserts 46 and 48. The retort 60 includes an organic matrix composite panel or metal workpiece and sandwiching susceptor sheets. The retort is heated to a forming or consolidation temperature by energizing the coils 35. When in the case of a composite panel the panel reaches the consolidation temperature at which the matrix resin flows, we apply gas pressure to the outer surfaces of the retort by pressure sources 52 and 54. Pressure source 52 applies pressure to the upper surface of the retort 60 through a conduit 62 that passes through the upper die 20 and upper tool insert 46, while pressure source 54 applies a pressure to the lower surface of the retort 60 through a conduit 64 that passes through the lower die 22 and lower tool insert 48. The pressure applied to the retort 60 is maintained until the retort has formed to the contour of the forming surface 58 and the matrix resin has consolidated. The pressure sources 52 and 54 generally apply a differential pressure to the retort 60.

Pin holes (not shown) in the tool inserts vent gas trapped between the retort 60 and the forming surface 58 as the retort deforms. Such pin holes can be coupled to a flow meter to monitor the progress of the deformation.

When the forming and consolidation is complete, the induction coils 35 are de-energized, and the pressure relieved. The tool inserts and dies are separated. We remove the formed retort 60 from the press and recover the composite part from between the susceptor sheets.

An alternating electrical current in the induction coils 35 produces an alternating magnetic field that heats the susceptor sheets of the retort via eddy current heating. The frequency at which the coil driver 50 drives the coils 35 depends upon the nature of the retort 60. Current penetration of copper at 3 kHz is approximately 0.06 inches, while penetration at 10 kHz is approximately 0.03 inches (0.75 mm). The shape of the coil also has a significant effect upon the magnetic field uniformity. Field uniformity is important because temperature uniformity in the retort is directly related to the uniformity of the magnetic field. Uniform heating insures that different portions of the retort will reach the forming and consolidation temperature of the composite material at approximately the same time. Solenoid type induction coils provide a uniform magnetic field, and are preferred. Greater field uniformity is produced in a retort that is symmetric. Those of ordinary skill can establish series/parallel induction coil combinations, variable turn spacing and distances between the part and the induction coil by standard electrical calculations to achieve the desired heating.

The tool inserts and dies are usually thermally insulating, and trap and contain heat within the retort. Since the dies and tool inserts are not inductively heated and act as insulators to maintain heat within the retort, the present invention requires far less energy to form and consolidate the composite panel than conventional autoclave or resistive hot press methods where the metal tooling is a massive heat sink necessary to conduct heat to the retort.

The forming operation of the present invention is faster than prior art forming operations because we do not heat the large thermal mass of either the dies or tool inserts prior to the induction heating process. The retort is heated, the tool is not. Thus, the necessary processing temperature is achieved more rapidly. In addition, the highly conductive materials in the retort provide rapid heat transfer and product. When the driver 50 is de-energized, the dies and the retort cool rapidly to a temperature at which we can remove the retort from the workcell, saving time and energy over conventional systems. In addition, the thermal cycle is not as limited by the heating and cooling cycle of the equipment and tools so we can tailor the thermocycle better to the process for which we are using the induction heating workcell.

Figure 3:
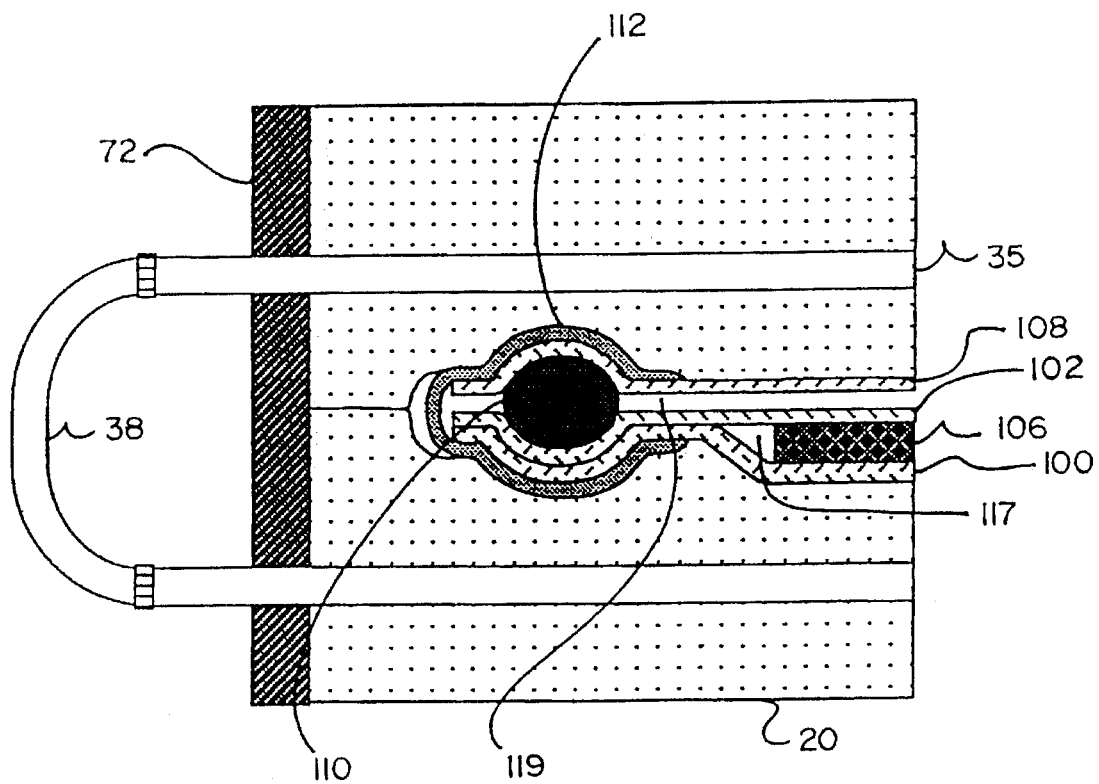
FIG. 3 is a schematic sectional view of our induction heating workcell showing the detail of the edge sealing for the resealable bag of the present invention.

For example, in a forming or consolidating process for organic (resin) matrix composites, a composite panel is laid-up from individual layers of prepreg. The composite panel is placed between a first sheet 100 and second sheet 102 of a susceptor (usually aluminum or an aluminum alloy) to form a retort. As shown in FIG. 3, the susceptor sheets are sealed around their periphery with a crimp formed into the susceptor sheets. A first pressure zone 117 between the susceptors 100 and 102 surrounds the composite panel. As shown in FIG. 3, a third sheet 108 of susceptor is positioned over the second sheet 102 and is edge sealed with another high temperature rubber gasket 110. Preferably, the gasket is silicone rubber and is sized to contain the prepreg 106 by abutting against it. The second and third sheets together define a second pressure zone 119 that can be pressurized with argon or another suitable gas during the forming and consolidating of the composite panel to provide an overpressure similar to the pressure common in conventional autoclave processing or a forming pressure, depending upon the part being made and the die configuration. A contact edge strip 112 acts as a compression edge seal and provides electrical continuity (i.e., acts as an electrical jumper) between the first and the third sheets 100 and 108 as well as pressing the sheets against the gasket. Additional compressive force is applied when the retort is clamped in the press. The first and second sheets abut in the vicinity of the gasket 110. Typically the contact edge strip 112 is a copper, elongated "C" because it has good conductivity, ductility, and susceptibility. Other metals could be substituted.

In FIG. 3, which illustrates a consolidation operation as opposed to a forming operation, the first and third sheets 100 and 108 of susceptors contact the dies, without leaving additional pressure zones between the outer susceptors and the dies, as we described with reference to FIG. 2. When additional pressure zones are used, these zones receive pressurized forming gas through a system of conduits fabricated in the dies as described in U.S. Pat. Nos. 4,708,008; 5,129,249; 5,309,747 or 5,419,170, which we incorporate by reference. When a third sheet 108 of susceptor is used, the retort incorporates the necessary pressure zones so that the dies can be porous. Such dies do not need to carry or contain high pressure gases. They are lighter, are easier to make, and are less expensive. Therefore, we prefer a system like that illustrated in FIG. 3.

Figure 4:
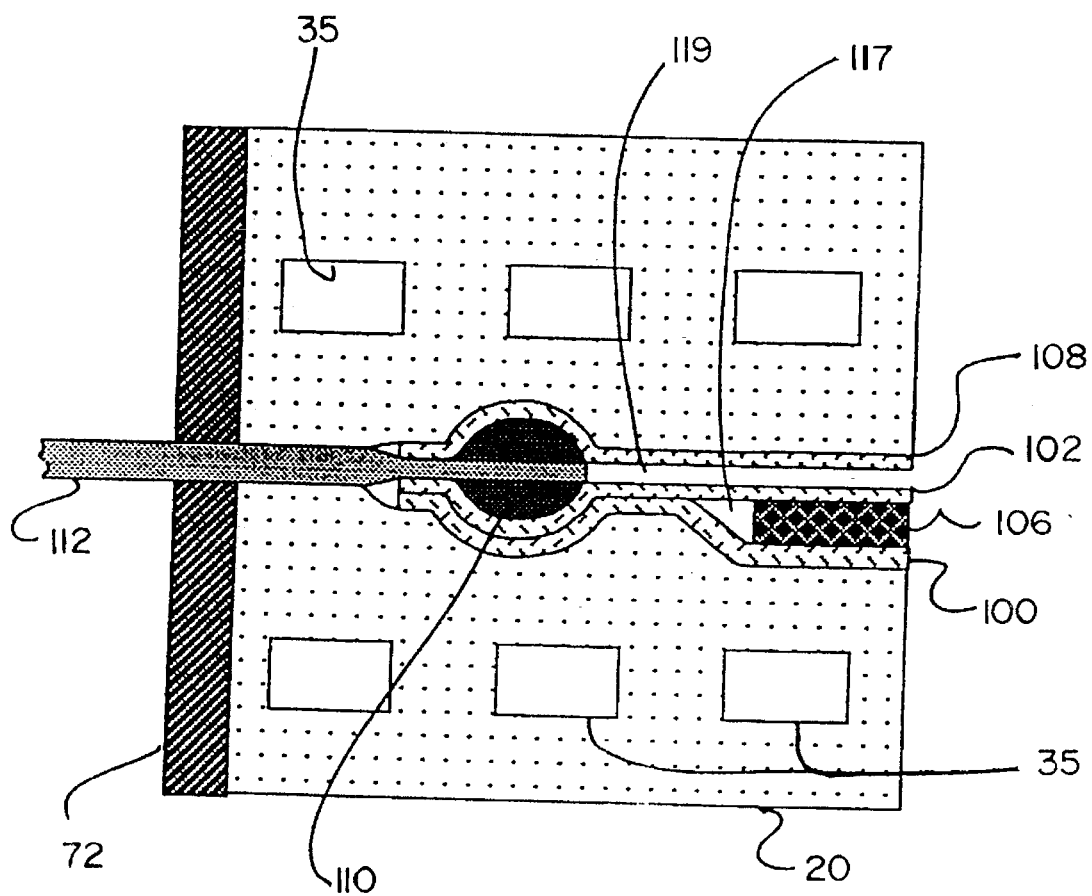
FIG. 4, similar to FIG. 3, is a schematic sectional view of our induction heating workcell showing a detail of the pressure inlet for the resealable bag.
Figure 5:
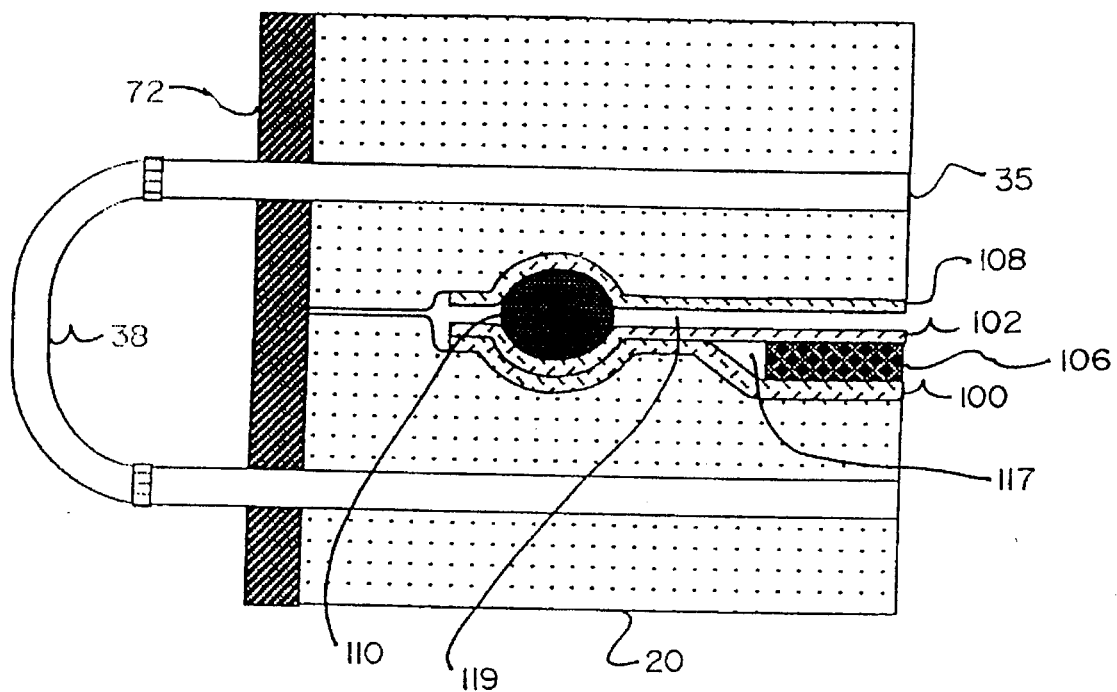
FIG. 5 is another schematic sectional view, similar to FIGS. 3 and 4, showing a copper gasket which allows us to eliminate the "C" clamp used in FIG. 3.

Forming gas to the pressure zone between the second and third sheet of the susceptors is introduced through suitable pressure lines 122 that penetrate the edge strip gasket 110 at desired locations, as shown in FIG. 4, to deliver pressurized inert gas to the second pressure zone 119. These pressure lines 122 correspond to those used with the edge welded retorts we described in U.S. Pat. No. 5,530,227. Similar lines can also be used to allow fluid communication with the pressure zone 117 between the first and second sheet of the susceptor where the composite panel prepreg is placed. If such lines are used, they generally are used to evaluate the first pressure zone 117.

After placing the retort between the upper and lower tool inserts and bringing the tool inserts together, we evacuate the pressure zone surrounding the composite panel. Pulling a vacuum around the composite panel helps to reduce voids in the completed composite part because we draw off any residual volatiles (i.e., solvent) in the prepreg and reaction products (especially water) generated during curing of the organic matrix resin. We can form void-free parts, just as though we used an autoclave. We achieve energy savings and time savings. Pulling a vacuum in the pressure zone around the panel also helps to ensure that the first sheet and second sheet seat tightly against the composite panel during consolidation and forming which in turn helps to prevent wrinkles and flaws in the surfaces of the completed part. Precision forming of the inner or outer mold lines, or both, is readily achieved.

While evacuating the zone around the panel, we energize the coils by the coil driver with a time varying electrical field to produce a time varying magnetic field to heat the susceptors inductively to the forming and consolidation temperature of the composite panel. Heat is transferred by conduction and/or radiation from the susceptors into the composite panel, so it, too, reaches consolidation temperature.

Gas is supplied to the second pressure zone between sheets 102 and 108 to force the diaphragm susceptor 102 against the composite panel to achieve the desired shaping of the composite panel in accordance with the shaping of the respective die insert configuration. The pressure within the pressure zone is maintained until the composite panel has fully formed and consolidated.

Pressurizing the second pressure zone 119 places a force on the retort which helps to consolidate the composite panel and regulates the rate at which the entire workpiece deforms. In some applications, it may be advantageous to pressurize and maintain an elevated pressure in the first pressure zone around the panel and to maintain the second pressure zone at the same pressure for a period of time to help consolidate the composite panel prior to forming. As forming begins in this procedure, we can reduce the pressure in the first pressure zone 117 around the panel slightly below the pressure in the second pressure zone and generally decrease the pressure in the first pressure zone thereafter to provide a differential pressure adequate to deform the composite panel and the first susceptor sheet 100 and second, diaphragm susceptor sheet 102 into contact with the forming surface 58.

After completing consolidation, we shut off the induction coils and cool the formed retort and tool inserts to a temperature below the forming temperature at which we remove the formed retort from the tool inserts. Although there is some heat transfer between the retort and the tool inserts, it is insufficient to heat the tool inserts or dies substantially because the dies are such good thermal insulators. Therefore, the retort can quickly be pulled from the press. When the retort cools sufficiently, we remove the edge strips and recover the completed part. Often the edge strips, the gasket, and the susceptor sheets are reusable.

In one example of composite consolidation and forming in accordance with the present invention, we consolidated and formed a composite panel comprising 48 layers of thermoplastic PEEK.IM6 prepreg ⅜ inch thick. Three aluminum sheets having a thickness of 1/16 inch were placed around the composite panel and the resulting retort was placed in the tool inserts and inductively heated in five minutes to a temperature of 720° F. by induction heating. We maintained the retort at 720° F. for two minutes and then cooled it for twenty minutes. The second pressure zone was then pressurized to approximately 250 psi while the first pressure zone 117 around the panel was vented to atmospheric pressure. The pressure in the second pressure zone 119 was maintained for 22 minutes to consolidate the composite panel and to compress it during the cure. These times and pressures are representative only and would differ depending upon the composite material used and the thickness and complexity of the formed part.

Depending upon the application, it may be advantageous to maintain different pressures in different cells of the pressure zone at different locations of the composite part. Welding the second and third sheet along one or more weld lines internal of the periphery defines separate pressure cells between these sheets that may be individually pressurized at different pressures. Of course, such welding destroys the reuse potential for these sheets.

The present invention is applicable to all types of organic matrix composites including both thermosetting and the thermoplastic composites such as epoxies, bismaleimides, polyimides, PEEK, PEK, PEKK, PES, or the like.

The surface of an aircraft wing skin must be maintained to a close tolerance to achieve an efficient aerodynamic surface. The tolerances of the inner mold line surface of the wing skin must also be maintained at a close tolerance at least in a buildup area where the wing skin will be joined to a spar to ensure that the wing skin and spar can be precisely joined. It is not critical, however, to control the inner mold line surface in areas where the wing skin is not attached to other structures. The composite panel has additional plies to define the buildup areas. The additional plies reinforce the composite panel in these areas which is necessary where a spar will be attached, and provide a convenient way to match the skin and spar to produce the desired outer wing configuration even if the spars are imprecise in their dimensions. We can fabricate built up areas at the laying surfaces to provide the precision fit, in which we can eliminate shims.

For metal processing, such as brazing, SPF, or a combined brazing/SPF processing cycle, we prefer to use copper susceptor sheets about 0.032–0.062 inches thick. The copper is a good susceptor and allows higher processing temperatures than aluminum or aluminum alloys. Copper also is an excellent susceptor material because it provides excellent heat transfer. Copper's excellent heat transfer properties help to ensure improved thermal uniformity. With copper, we typically use an inert atmosphere within the interior pressure zones to protect the copper and the parts being produced (i.e. the workpiece) against corrosion. That is, the inert gas purge protects the workpiece (and the copper retort materials) from oxygen damage.

The processing of metals with the resealable bag retort is essentially the same as that described for the forming and consolidating of organic matrix composites, so we will not repeat it here. Suffice it to say that the metal workpiece (one or more sheets) is enclosed between the copper susceptor sheets to form a retort.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A retort for induction processing, comprising:
    a plurality of metal susceptor sheets susceptible to induction heating sealingly arranged to form a sandwich defining a first pressure zone isolated from a second pressure zone;
    clamping means for temporarily sealing the metal sheets around their peripheries, the clamping means including a pliant contact edge strip contacting the outer sheets in the sandwich to press the sheets together and to provide electrical continuity between the outer sheets; and
    a workpiece in the first zone.
2. The retort of claim 1 wherein the clamping means includes a gasket that is sandwiched between susceptor sheets near their peripheries.
3. The retort of claim 2 wherein the gasket is selected from the group consisting of rubber, copper, and stainless steel.
4. The retort of claim 3 wherein the gasket is received in a groove in the susceptor sheets.
5. The retort of claim 1 wherein the sheets are selected from the group consisting of aluminum or an aluminum alloy and the workpiece is an organic matrix composite panel prepreg.
6. The retort of claim 5 wherein three susceptor sheets are stacked and wherein a metal jumper electrically connects at least two edges of the outer sheets, and further comprising means for fluid communication to the two pressure zones; the first pressure zone being between the first and second sheets, the second pressure zone being between the second and third sheets.
7. The retort of claim 6 wherein the clamping means includes a gasket selected from the group consisting of rubber, copper, and stainless steel.
8. The retort of claim 1 wherein the susceptor sheets are copper.
9. The retort of claim 7 wherein the gasket is silicone rubber.
10. The retort of claim 6 wherein the number is a C-shaped elongated copper strip that provides a conductive path between the susceptor sheets when eddy currents are induced in the sheets.
11. A method for processing a workpiece in an induction heating operation, comprising the steps of:
    (a) assembling a retort having at least two sheets of susceptors sandwiching a workpiece;
    (b) temporarily sealing the susceptor sheets with a gasket around the peripheral edges of the sheets and with a plurality of edge strip clamps;
    (c) positioning the sealed retort in an induction heating workcell;
    (d) heating the workpiece in the workcell by heating the susceptor sheets with induction;
    (e) disassembling the sealed retort to recover the gasket, edge strip clamps, susceptor sheets, and workpiece separately; and
    (f) reusing the gasket and edge strips clamps.
12. The method of claim 11 wherein the step of sealing includes using at least two edge strip clamps as electrical jumpers for the upper and lower sheet in the retort.
13. The method of claim 11 further comprising the step of reusing the susceptor sheets.
14. The method of claim 11 wherein the gasket is rubber, copper, or stainless steel.
15. The method of claim 11 wherein the susceptor sheets are crimped around their peripheries to receive the gasket.
16. A retort for induction processing, comprising:
    a plurality of metal susceptor sheets susceptible to induction heating sealing arranged to form a sandwich with a peripheral crimp to define a first pressure zone isolated from a second pressure zone by an internal diaphragm;
    a gasket seated in the peripheral crimp; and
    a workpiece seated in the first pressure zone on the diaphragm.

* * * * *